Sept. 22, 1959  J. B. WALKER  2,905,758
PANORAMIC TELEVISION CAMERAS
Filed July 28, 1955

INVENTOR.
JOSEPH B. WALKER
BY Harry R. Lubcke
AGENT

United States Patent Office 2,905,758
Patented Sept. 22, 1959

2,905,758

PANORAMIC TELEVISION CAMERAS

Joseph B. Walker, Los Angeles, Calif.

Application July 28, 1955, Serial No. 524,899

12 Claims. (Cl. 178—7.2)

My invention relates to apparatus for obtaining a panoramic view by television-like means, and particularly by optically sweeping the panorama to include more than can be presented within the scope of the television screen from a stationary camera.

Numerous instances now arise where a panoramic view is desired by television and especially so should it be possible to obtain such a view without requiring an operator at the camera. A panoramic view covering a semicircle without an operator is valuable in military operations, at intersections of freeways for traffic observation, in industrial operations for plant surveillance, for production line observation, for observing several processing equipments located one adjacent to another, for monitoring areas exposed to atomic radiation, and for underwater exploration.

It is apparent that a panning action of the usual camera on the usual tripod head, either manually or automatically, is not a satisfactory solution to the problem presented. Considerable space is required for such an operation and it is conspicuous. The movement is vulnerable to objects entering the panning path for any reason. A large movement occurs which is easily detected by an enemy in military operations. The optical lenses are vulnerable, making such an arrangement unsuitable for military, underwater or hazardous locations. Furthermore, the usually rectangular external case and certain other elements of the apparatus are rotated in such an arrangement which need not be rotated to accomplish the desired function.

An object of my invention is to provide a panoramic television camera having particular simplicity and utility for taking panoramas in unattended operation.

Another object is to provide an unattended camera largely immune to damage by external means.

Another object is to provide a television camera giving a panorama several times the width of the television image without moving the outer case of the camera.

Another object is to provide a single television camera which is equally suitable for military, underwater or hazardous location use.

Another object is to provide a camera which can be made to give a closeup view of any selected part of a panorama.

Another object is to provide a camera which can be made to automatically give an inclined panorama.

Another object is to provide a camera which is rugged and capable of withstanding environmental conditions more rigorous than can be withstood by usual camera constructions.

Another object is to provide a remote adjustment by which the elevation at which the panorama is taken may be varied.

Other objects of my invention will become apparent upon reading the following detailed specification and upon examining the related drawings, in which.

Figure 1:
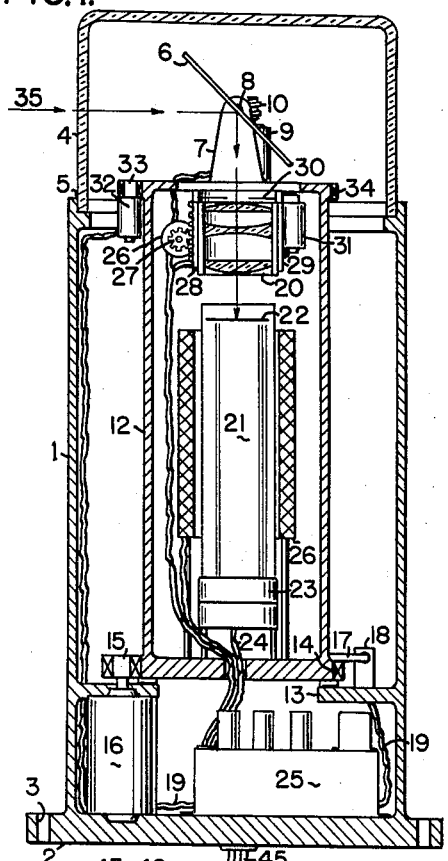
Fig. 1 is a sectional elevation view of one form of my invention.

In Fig. 1, numeral 1 indicates the outer housing of my camera. This is preferably cylindrical and provided with a base flange 2 having holes 3 for rigidly bolting to any object capable of serving as a foundation if on land or to manipulative tackle if for underwater. Part 4 is a transparent annulus. This is fitted to the housing in a water-tight manner at joint 5 and preferably takes the form of the inverted bowl shown.

Lying obliquely across the axis of the cylindrical housing is reflector 6, preferably a first surface mirror. This element is for the purpose of altering the direction of the optical path within the camera so that axial rotation of the optical parts causes the external optical path to sweep over the surrounding field of view like the beam of a searchlight from a lighthouse. Assuming the axis of the housing to be normally vertical the reflector is normally positioned about 45° from the vertical so that the usual horizontally swept-out panorama is obtained. However, reflector 6 is held in a U-shaped stand 7 and is capable of being revolved about shaft 8 by motor 9 through worm 10 engaging worm gear 11 upon the shaft. This allows a panorama either above or below the horizon to be swept out, or on a plane inclined to the horizon, and fills an important need.

In Fig. 1 reflector 6 surmounts an inner rotatable cylinder 12 which is roller (or ball) bearing mounted upon the ring-shelf ledge 13 of the outer case 1. A ring gear 14 surrounds the lower portion of cylinder 12 and by means of pinion 15 motor 16 drives the cylinder. The latter is fitted with a projection 17 which engages back-to-back microswitches 18. These are connected by wire cable 19 to motor 16 such as to reverse the same automatically at slightly less than one revolution of the inner cylinder. Besides providing a convenience in reference in the panorama to the viewer this allows flexible ("pigtail") connections from all the electrical elements mounted upon the inner cylinder to non-rotative apparatus within the housing.

Returning to the optical system, a lens 20 is next in line. This lens is of photographic quality and may contain plural positive as well as negative lens elements as shown, fixed in position one to the other. Axially disposed below the lens is a camera tube 21, having image-receiving surface 22, and the known base 23 from which electrical connections 24 pass to chassis 25 for further electrical processing according to known television techniques. The tube is surrounded by electron focusing and deflection yoke 26 which coacts with the tube in forming a television signal from the image impressed upon surface 22. This image is focused by actuating motor 26. Pinion 27 thereon engages rack 28 attached to lens 20, which slides up or down in sleeve 29.

An iris 30 is interposed in the optical system before lens 20 and motor 31 is provided for remotely actuating the iris. Motor 32 is of the selsyn or wound rotor synchronous type and is geared by pinion 33 to ring gear 34 in order to indicate where the axis of the optical path is pointed at any given instant in the panoramic cycle. The optical axis from the field of view is indicated by arrows 35.

To facilitate remote control of the camera a remote control panel 40 is provided. A companion selsyn or wound rotor synchronous type motor 41 is mounted therebehind, being electrically connected to the first-mentioned motor of this type, 32, and being provided with an engraved dial 42, of which the numeral "10" is seen through window 43 in the panel. Motors 32 and 41 are locked together electrically and an equivalent gear reduction is provided in each instance, thus the dial is maintained in the same angular relation to the window as the optical path is to the panorama, and the direction of the view at any instant may be read in the window. The dial 42 is calibrated from 0° to 360° in azimuth.

Several controls are also located on the control panel. The one 44 labelled "Focus" is a reversing switch with a central "off" position and is connected through some of the conductors of the multi-conductor cable 45 to motor 26 for the bi-directional control thereof. In a similar manner the "Pan" knob 46 controls motor 16. It is thus possible to stop the automatic panning action at any point and to explore left or right therefrom by approximately turning knob 46. The "Tilt" knob 47 is the on-off-reverse switch for motor 9 and is connected thereto through cable 45. This allows the elevation of the panorama to be adjusted as desired; for instance, to intercept airplanes rather than ground level objects. The "Iris" knob 48 actuates an on-off-reverse switch connected to iris control motor 31 for opening or closing the iris to give optimum light intensity upon the camera tube surface 22 regardless of the light intensity existent in the field of view. The other controls are discussed later.

The several motors are connected to a source of electrical power through the control switches which have been identified in a known manner, one such connection being shown and described in my U.S. Patent No. 2,705,908, issued April 12, 1955.

Figure 2:
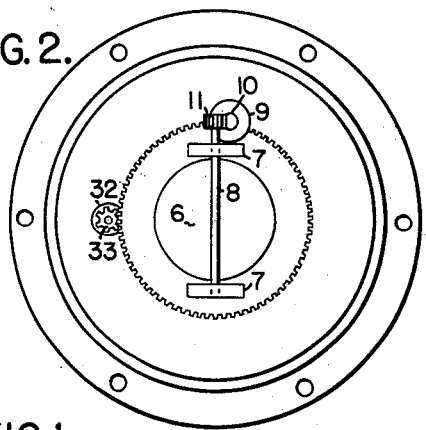
Fig. 2 is a plan view of the same.
Figure 4:
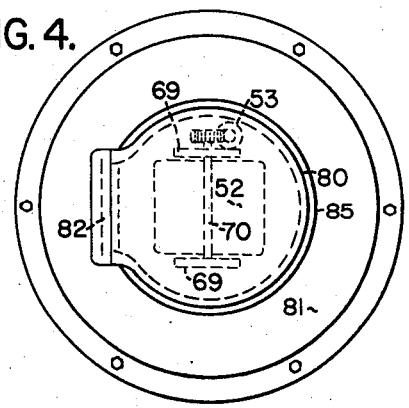
Fig. 4 is a plan view of the same.

The above-described embodiment of Figs. 1 and 2 accomplishes many of the objects of my invention. We now turn to the embodiment of Figs. 3 and 4, which is of somewhat different construction and which allows a closeup of the field of view and/or of selected portions of it.

Figure 3:
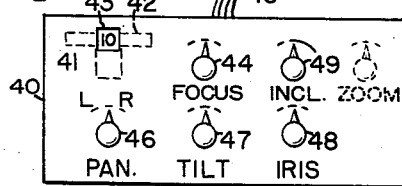
Fig. 3 is a sectional elevational view of an alternate form of my invention.
Figure 3:
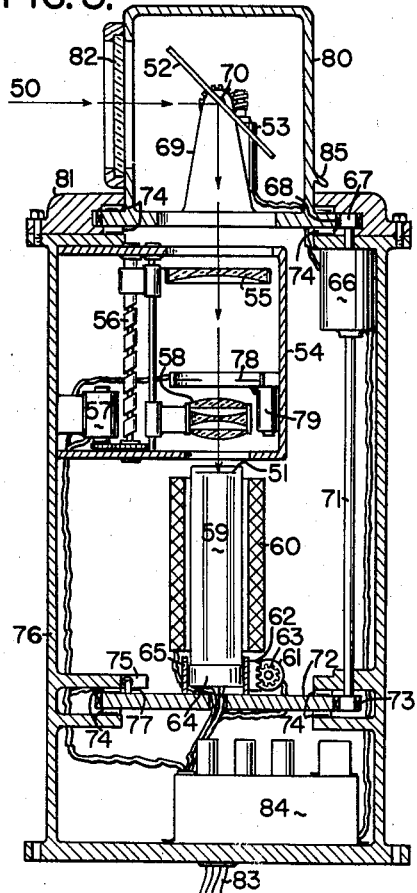

In Fig. 3 the arrows 50 indicate the axis of the path of rays from the field of view down to the image-receiving surface 51, essentially the same as before. The view taken is inclined above or below the horizontal by altering the inclination of reflector 52 by energizing motor 53. A control panel like 40 of Fig. 1 is utilized with the embodiment of Fig. 3 and the "Tilt" knob controls the inclination of the reflector, as before.

The distinguishing optical characteristic of this second embodiment is the use of a variable focus lens, such as the Electra-zoom generally indicated by its case 54, and that the lens does not revolve, as did prior lens 29. Since all spherical lenses have circular symmetry it is not necessary that such a lens revolve in an apparatus of this type. The Electra-zoom lens has been described in my U.S. Patent Nos. 2,515,104, July 11, 1950; 2,532,685, December 5, 1950; and 2,547,187, April 3, 1951. In Fig. 3, element 55 is the negative lens which is translated by worm 56 by motor 57. Positive lens 58 is concurrently mved by a cam not shown in this sectional view so that as the focal length of the combination is thus varied the focal plane of the resulting image remains stationary, as is more fully treated in the patents.

The image of the field of view is properly focused upon surface 51 by axial translation of that surface. This is accomplished by moving the whole camera tube 59 and coil assembly 60 by means of motor 61 translating rack 62 through pinion 63 and the tube base 64 sliding in sleeve 65. Motor 61 is controlled by the "Focus" control on the remote control panel, as before. The focal length varying motor 57 is similarly controlled by an on-off-reverse switch labelled "Zoom" and shown dotted.

In order that a panorama be obtained with the camera of Fig. 3 it is necessary that the reflector 52 and the image-receiving surface 51 be synchronously rotated. This is accomplished by motor 66, the shaft of which extends out of both ends thereof. At the upper end of the shaft pinion 67 meshes with the ring gear 68, the latter being rigidly attached to the standards 69 which support reflector 52 by means of shaft 70 and also rigidly attached to the upper rotatable piece 80. At the lower end shaft 71 engages ring gear 72 through pinion 73. Both ring gears are supported top and bottom by recessed roller (or ball) bearings 74, with preference shown for support at three points for optical stability unless the bearings be precision and in a continuous ring. The gears and pinions are identical and are carefully ground and fitted so that the motion of both the reflector and image-receiving surface is exactly synchronous.

As before, the several electrical and television signal connections are economically and satisfactorily made by means of flexible insulated conductors. A pair of stop and reverse microswitches 75, or the equivalent in mechanically actuated switches, are attached to the lower housing 76. An arm 77 on ring gear 72 actuates the microswitches at each minimum and maximum of azimuth and reverses motor 66.

A remotely controlled iris is shown within the Electra-zoom lens at 78. This is actuated by electric motor 79 which is reversibly controlled by an "Iris" switch, as 48 in Fig. 1.

The housing of Fig. 3 is formed in two pieces for allowing insertion of the revolving portion 80. Flanges are provided on both the upper and lower stationary portions 81 and 76 for assembly. The revolvable portion 80 is formed of metal except for a single transparent porthole 82. The joint between parts 80 and 81 is made water tight by including a thin formed valve type packing therein, or by turning converging right and left hand spiral "threads" in the rubbing surfaces and filling the same with a mixture of the known vacuum grease Apiezon "M" and colloidal graphite. Where water tightness is not important the rain drip shield 85 is sufficient. Gaskets are employed at the flanges of the housing and where the electrical cable 83 emerges from the lower portion. This embodiment is suited for military use where ambient conditions are rigorous because the exposure of glass is small.

Chassis 84 contains television image signal amplifier stages, scanning waveform circuits for yoke 60 and other known electrical circuits for the operation of the camera.

In order to obtain a closeup of a particular portion of the field of view with the embodiment shown in Fig. 3 the operator stops the "Pan" operation when he notes the portion of the panorama of which he desires the closeup and then actuates the "Zoom" motor control to give maximum focal length of the Electra-zoom lens, i.e., lenses 55 and 58 closest together.

In order to limit the arc over which the panorama is taken additional mounting holes are provided for mounting the back-to-back microswitches 18 apart in Fig. 1 and the corresponding switches 75 of Fig. 3. In this way the panorama can be limited to the semicircle of a battlefield or a right angle of a freeway intersection.

The image tubes 21 and 59 shown in the figures may be any of the known types, of which the image-orthicon, the vidicon and the image-dissector are illustrative. Any type may be used in either embodiment. Similarly, for color television the new tricolor vidicon tube may be employed, this being of the same size as the usual image-orthicon and achieving color by a composite fine structure upon the image-receiving surface corresponding to 22 or 51 in the figures.

It is possible to mount the preamplifier or other portion of the apparatus of chasses 25 or 84 upon the rotating structures immediately adjacent to the base of the camera tube. Likewise, rather than the cabled electrical connections 24 in Fig. 1 and elsewhere for connecting the rotative to the stationary apparatus I can employ a slip-ring and brush for each such connection, or a mutual inductive or capacitative pickup relation. With these alternates it is not necessary that the rotation be limited, the rotation may continue indefinitely in one direction.

With suitable attention to dimensions the lenses of the two embodiments may also be interchanged. The Electrazoom lens may be rotated and the ordinary lens 20 may be held stationary. It will also be understood that ordinary lenses may be interchanged manually to obtain different focal lengths or that these may be placed on a turret and this revolved by a control motor in the same way as previously described for the "Pan" control, save that the lens-changing control would normally be set to "off" while the "Pan" control is normally set for rotation in one direction or the other.

It is important that at least both the reflector and the image-receiving surface be synchronously rotated. Were the reflector only to be rotated the image on the surface would periodically revolve to an upside down position and so would the reproduced television picture, an obviously undesirable performance.

While I have illustrated and described the Electrazoom type of variable focal length lens it is possible to use other types of such lenses. Examples include those having only one movable element, a negative lens; those having a circular cam cut in the lens housing for accomplishing variation of focal length; and so on.

Variable speed motors may be used for the "Pan" action but I favor a constant speed of about one revolution in seven seconds for normal panoramic viewing. Reflectors 6 or 52 may be replaced by equivalent prisms or other optical elements capable of accomplishing essentially right angle reflection. Rather than glass for the transparent elements 4 or 82, Plexiglas or durable transparent plastic compounds may be used to better resist the impact of objects thereupon.

By operating the "Tilt" control in synchronism with the automatic panoramic motion it is possible to obtain a panorama having a vertical inclination, as to follow the surface of the earth up a hill. This is of importance when automatically accomplished by the circuit identified by the "Incl" control 49 upon control panel 40. This is a two way switch and rheostat. In the left position the normal "Tilt" manual control obtains. In the right hand position the control of the inclination motor 9 (or 53) is by the azimuth limit switches 18 (or 75) so that the motor tilts reflector 6 (or 52) upward when the optical system is revolving in one direction in azimuth and downward when in the other direction. The amount of the tilt is inversely as the resistance introduced into the tilt motor circuit by the setting of the rheostat.

With a suitable length of control cable 45 (or 83) the control station for the camera can be located any distance up to thousands of feet away. Known coaxial cable amplification techniques may be used to extend this distance, since the strength of the television image signal and the alteration of the form of scanning pulses are the limits to the cable distance without amplification at intermediate points. These signals and pulses pass through conductors of cable 45 (or 83) and to television monitoring and other apparatus. This apparatus is conventional and thus is not shown.

With suitable television synchronizing equipment and power sources provided at or in the camera, the latter may become self-contained as to producing a television signal. Further, the inclusion of a microwave or equivalent radio transmitter allows the camera to send image signals to a distant point without wires. In this event the camera is set up to operate with normal adjustments automatically, or the several adjustments such as "Tilt," "Pan" control and "Zoom" can be repeated back to the camera from the distant point by known telemeter systems by using a return radio channel or channels from the control point to the camera.

It will be appreciated that should a housing of square cross-section be desirable for secondary reasons this is contemplated in my invention, save that the cylindrical annulus 4 of transparent material is still to be preferred for superior optics in the embodiment of Fig. 1.

Numerous other changes in structural and electronic details, and modifications in size, proportions and performance characteristics may also be made without departing from the scope of my invention as outlined by the following claims.

Having fully described my invention and the manner in which it is to be practiced, I claim:

1. A camera for automatically producing upright panoramic television images having a greater sequentially-revealed scope than the lateral limits of the optical system thereof, comprising; in order, a television camera tube having an image-receiving surface of width greater than height, an image-forming lens with optical axis positioned fixedly perpendicularly to said surface, and a reflector obliquely disposed across said optical axis; a structurally rigid housing, means to revolve at least said tube and said reflector in fixed alignment about said optical axis within angular limits within said housing, at least that portion of said housing intercepted by the optical path adjacent said optical axis as reflected by said reflector being optically transparent, means to remotely alter the obliquity of said reflector to said optical axis, and means to remotely move said image-receiving surface to focus an image thereupon.

2. A camera for producing upright panoramic television images having greater sequentially-revealed scope than the limits of the optical system thereof comprising a vertically disposed lens and camera tube fixedly coaxial with an axis of rotation for forming an image of width comparable to the height thereof, a reflector beyond said lens disposed at an angle to said axis of rotation, a housing of fixed shape surrounding said elements, said housing having a transparent portion adjacent said reflector, a ring gear structure mounting at least said reflector and said camera tube in fixed optical alignment, said structure mounted within said housing upon bearings adapting said structure for revolution, a pinion meshing with the ring gear of said structure, means to drive said pinion, and electrical means for the reversible control of said driving means, and further electrical means to alter the axial separation of said lens and said camera tube for focusing said image.

3. In a camera for producing panoramic television images having a greater sequentially-revealed scope than the static limits of the optical system thereof, means for producing an inclined upright panoramic image comprising, a rigid rotative structure, a reflective element lying across and at an angle to the axis of rotation of said structure, an image-forming lens having an optical axis coincident with said axis of rotation, and a camera tube having an image-receiving surface lying fixedly perpendicular to said axis of rotation, in the order recited, said image-receiving surface disposed to receive substantially the whole image formed by said lens, electromechanical means to reversibly rotate said structure within limits set by switches, further electromechanical means to reversibly alter the angle of said reflective element to said axis of rotation, said further electromechanical means also controlled by said switches simultaneously with said electromechanical means to obtan said inclined image.

4. A panoramic television camera comprising a nondeformable cylindrical watertight outer casing having a transparent portion near one end, reflective means within said casing adjacent said transparent portion lying at an angle to the axis of said cylindrical casing, a lens having an optical fixed axis lying along the axis of said cylindrical casing adjacent the reflective side of said reflective means, a camera tube having an image-receiving surface, said surface lying perpendicularly to the optical axis of said lens upon the side thereof away from said reflective means to accept the whole image formed by said lens, electromechanical means to synchronously rotate at least said reflective means and said image-receiving surface in fixed optical alignment within said casing for obtaining an upright sequentially revealed panorama greater than the static limits of the field of view of the optical system described, and further electromechanical means to axially translate said camera tube for focusing said whole image.

5. A camera for automatically producing totally upright panoramic television images having a greater sequentially-revealed field of view than the lateral limits of the optical system thereof comprising a cylindrical housing having two constantly aligned parts, one part thereof being transparent, a reflector obliquely positioned to the axis of said cylindrical housing adjacent to and within said transparent part, a positive lens upon said axis adjacent said reflector, a camera tube having an image-receiving surface intersecting said axis at the plane of the image of said field of view formed by said lens to accept substantially all said image, a structure for revolvably supporting said reflector, a structure for revolvably supporting said camera tube, common means to revolve said structures in fixed optical alignment, electrical means to adjust the obliquity of said reflector for viewing different elevations of the panoramic field of view, electrical means to alter the separation of said positive lens and said image-receiving surface to focus said image, an iris in fixed optical alignment with said reflector and said camera tube, electrical means to adjust the aperture of said iris to accommodate varying illumination of the field of view, a stationary television chassis, and flexible conductive means to electrically connect said camera tube to television apparatus upon said chassis.

6. A rugged non-deformable television camera for automatically producing upright panoramic images of distant objects having a greater scope than the limits of the optical system of said camera comprising a television camera tube having a sensitive surface, a lens mounted in fixed axial relation above said tube for forming a whole image of the field of view upon said sensitive surface, a reflecting surface mounted with one degree of freedom of motion above said lens and oriented to direct the optical axis of said lens to the desired field of view, means to remotely alter the orientation of said reflecting surface, stationary electrical apparatus auxiliary to said camera tube, torsionally flexible electrically conductive means to connect said tube to said apparatus, a rigid housing for the recited elements, said housing having a transparent area adjacent said reflective surface, remote means to simultaneously and proportionally revolve at least said reflecting surface and said camera tube in fixed optical alignment within said housing reversibly over a circular arc to produce moving panoramic images of the field of view at least partially surrounding the location of said camera.

7. A camera for producing continuously upright panoramic television images of objects located at distances large with respect to the length of the image optical path within the camera having greater sequentially-revealed scope than the lateral limits of the optical system thereof comprising a lens for forming a real image, said lens having an optical axis, an iris for said lens, a television camera tube having an image-receiving surface pierced by said axis and lying essentially perpendicular thereto, a reflective element athwart said axis on the side of said lens opposite said surface, an outer housing having two portions, a revolvable structure within the outer limits of said housing, said structure carrying at least said reflective element and said image-receiving surface in fixed optical alignment, electromechanical means to reversibly revolve said structure about said optical axis, other electromechanical means to alter the inclination of said reflective element to said axis, further electromechanical means to change the opening of said iris, still further means to alter the axial distance of said image-receiving surface with respect to said lens, the portion of said housing adjacent said reflective element being transparent, stationary television apparatus, torsionally flexible electrically conductive means to connect said tube to said apparatus, a control panel remotely located from said camera having a control for each electromechanical means and further electrically conductive means to connect said controls to said electromechanical means.

8. A camera for automatically producing panoramic television images having a greater sequentially-revealed field of view than the lateral static limits of the optical system thereof comprising, in order, a mirror inclined to the substantially horizontal plane of the panorama, an image-forming lens having an optical axis substantially vertically disposed and positioned to intersect the central area of said mirror, a camera tube having an image-receiving surface, said tube disposed with the image-receiving surface essentially perpendicular to the optical axis of said lens, electromechanical means to alter the axial separation of said lens and said tube to focus an image of the field of view upon said surface, other electromechanical means to alter the inclination of said mirror to change the elevation of the panorama imaged upon said surface, an iris surrounding said optical axis between said mirror and said surface, further electromechanical means to alter the opening of said iris, a revolvable structure for simultaneously and synchronously revolving at least said mirror and said camera tube, still further electromechanical means for revolving said structure, limit switch means adjacent said structure mechanically related thereto and electrically related to the still further electromechanical means for revolving said structure to limit the rotation of said structure to not more than one revolution, a substantially vertically disposed cylindrical housing for enclosing said camera having parts, the axis of said housing being colinear with said optical axis, a transparent part of said housing surrounding said mirror for passing light from the field of view to said mirror, electrical circuits for said camera tube mechanically associated therewith, further stationary electrical circuits for forming a television signal from the image upon said image-receiving surface, a multiconductor cable for connecting both said electrical circuits, a control board having controls for said electromechanical means, and other conductors connected between said controls and said electromechanical means for the electrical control thereof.

9. The camera of claim 8 in which a synchronous electromechanical repeater is associated with said control panel and connected to an electromechanical means associated with said revolvable structure for indicating the angular aspect of said structure within the panorama upon the control panel.

10. A camera for automatically producing exclusively upright panoramic television images of distant objects at adjustable magnification having a greater sequentially-revealed field of view than the lateral limits of the optical system thereof comprising, in order and in fixed optical alignment, a reflector for altering the direction of light from said field of view, a variable focal-length lens having an optical axis, said lens disposed to intercept said light, and an image-receiving surface disposed to receive substantially the whole image formed by said lens, means to translate said image receiving surface along said optical axis for focusing; electrical means to synchronously rotate, within angular limits, said reflector and said surface about the optical axis of said lens, a rigid housing, a transparent window in said housing adjacent said reflector, means to remotely vary the focal length of said lens, electromechanical means to remotely focus the image of the field of view upon said image-receiving surface, control means to halt the rotation of said reflector and said surface at will, and means to remotely alter the aspect of said reflector.

11. A camera for producing panoramic television images having greater sequentially-revealed scope than the lateral limits of the optical system thereof comprising a stationary outer cylindrical structurally rigid housing, a transparent cylinder having an integral top surmounting said housing, a single inner rigid revolvable structure, said structure supporting in order and in constant optical alignment a mirror inclined to the axis of said revolvable structure, an iris, a light-converging lens and a television camera tube having an image-receiving surface, a first motor, worm and gear for altering the inclination of said mirror, a second motor for changing the opening of said iris, a third motor, pinion and rack for focusing said lens to form an image of the panorama on said surface, a ring gear surrounding said inner revolvable structure, a fourth motor and a pinion engaging said ring gear for revolving said rigid structure, angular limit switches attached to said outer housing, a member attached to said revolvable structure to actuate said switches, television apparatus adjacent said camera tube, other stationary television apparatus, a multiconductor cable to connect said revolvable and said stationary television apparatus, a control panel, said panel including control means for each of said motors, a position-indicating motor mounted upon said housing and geared to said structure, a position-indicating motor mounted upon said panel, and a multiconductor cable connecting said motors and said controls.

12. A camera for producing panoramic television images having greater sequentially-revealed scope than the lateral limits of the optical system thereof comprising an outer cylindrical housing, said housing having a lower stationary part and an upper revolvable part, a transparent window in said revolvable part, a first revolvable inner structure, said structure supporting a mirror inclined to the axis of said structure and to the revolvable part of said housing, a variable focal length lens having an axially movable light-diverging lens element, said lens supported by said stationary outer housing and positioned below said mirror with the optical axis thereof coincident with the axis of rotation of said inner structure, an iris within said variable focal length lens, a second revolvable inner structure below said lens having an axis of revolution colinear with the axis of said first inner structure, a television camera tube mounted upon said second structure having an image-receiving surface symmetrically related to said axis of rotation and positioned to receive an image formed by said lens, a first motor, a worm and a gear for altering the inclination of said mirror, a second motor for changing the opening of said iris, a third motor, a pinion and a rack for axially moving the camera tube to focus said image upon said surface, a fourth motor for altering the focal length of said variable focal length lens, ring gears surrounding said first and second revolvable inner structures, a fifth motor attached to said housing and having a pinion meshing with each of said ring gears, angular limit switches attached to said housing, a member attached to one said revolvable structure to actuate said switches, television apparatus adjacent said camera tube, other stationary television apparatus, a multiconductor cable to connect said revolvable and said stationary television apparatus, and a control panel, said panel including control means for each of said motors.

References Cited in the file of this patent

UNITED STATES PATENTS

| | | |
|---|---|---|
| 1,660,886 | Randall | Feb. 28, 1928 |
| 2,306,862 | Brown | Dec. 29, 1942 |
| 2,516,069 | Newhouse | July 18, 1950 |
| 2,532,685 | Walker | Dec. 5, 1950 |
| 2,845,485 | Sheldon | July 29, 1958 |

FOREIGN PATENTS

| | | |
|---|---|---|
| 287,488 | Germany | Sept. 25, 1915 |